United States Patent [19]

Onoda et al.

[11] 4,185,890

[45] Jan. 29, 1980

[54] OPTICAL TRANSMISSION LINE

[75] Inventors: Seiichi Onoda, Tokorozawa; Toshiki P. Tanaka, Tokyo; Tsuneo Suganuma, Tokorozawa; Koji Ishida, Tokyo; Masao Sumi, both of Higashi-yamato, all of Japan

[73] Assignee: Hitachi Ltd., Japan

[21] Appl. No.: 734,310

[22] Filed: Oct. 20, 1976

[30] Foreign Application Priority Data

Oct. 20, 1975 [JP] Japan ................................ 50-125318

[51] Int. Cl.² .............................................. G02B 5/14
[52] U.S. Cl. ............................ 350/96.33; 350/96.31
[58] Field of Search ................... 350/96, 96.30, 96.31, 350/96.33

[56] References Cited
U.S. PATENT DOCUMENTS 3,785,718  1/1974  Gloge ......................... 350/96 GN X Primary Examiner—Rolf G. Hille
Attorney, Agent, or Firm—Craig and Antonelli

[57] ABSTRACT

In order to expand the product between the transmission length and the transmission bandwidth of an optical fiber for use in the optical communication and to facilitate the connection between the optical fibers, the optical fiber is made of transparent materials of three concentric layers of a core whose refractive index gradually decreases in the radial direction from the center, an intermediate layer which has a uniform refractive index lower than the varying refractive index of the core, and a cladding which has a uniform refractive index substantially equal to the lowest refractive index of the core.

7 Claims, 2 Drawing Figures

OPTICAL TRANSMISSION LINE

BACKGROUND OF THE INVENTION (1) Field of the Invention

This invention relates to an optical waveguide or optical fiber, and more particularly to an optical transmission line which allows the transmission of only limited modes for use in an optical communication system.

(2) Description of the Prior Art

As the optical waveguide, the so-called optical fiber employing glass is generally known. In recent years, it has rapidly progressed to render the transmission loss of the optical fiber low, and it has become possible to obtain an optical fiber which can transmit light in the wavelength region of a semiconductor light source at a loss lower than several decibels per kilometer. This signifies that the transmission length or the repeater spacing can be extended in the optical communication system which utilizes the optical fiber as the waveguide or transmission line. On the other hand, however, the optical fiber is subject to the fundamental restriction that the product between the transmission bandwidth and the transmission length (hereinafter, termed the BL product) is constant. Therefore, when the transmission length is stretched, the transmission band cannot avoid becoming narrow accordingly. In order to fully exploit the low loss property of the fiber, therefore, the BL product of the optical fiber need be made large.

The first method for making the BL product of the optical fiber large is to render the propagation mode of the optical fiber single, i. e., to put the optical fiber into the single mode fiber. In general, the fiber is constructed of a core of comparatively high refractive index and a cladding layer, and the diameter of the core is as very small as several microns. With this method, therefore, it is difficult to launch light into the optical fiber and to connect the optical fibers to each other.

The second method is to form the so-called graded-core fiber in which the refractive index distribution in the section of the optical fiber is continuously lowered from the center towards the periphery. Ideally, the refractive index distribution need be a parabolic distribution. However, insofar as the optical fiber is finite in the radial direction, the parabolic distribution of refractive indexes inevitably falls into a shape in which the parabola is cut off halfway. In this case, the group delay of propagation modes near the cut-off point becomes smaller than that of the other modes, which becomes a factor for the limitation of the band.

Among the modes propagating over the optical fiber, there are the skew mode in which a light beam travels helically with respect to the lengthwise direction of the optical fiber and the meridional mode in which a light beam meanders on a certain fixed vertical section. Any refractive index distribution which can make zero the group delay difference among all the modes including such modes cannot exist. In this sense, whatever refractive index distributions are given, the graded-core optical fiber cannot bestow a perfect focussing action on all the modes. Accordingly, as the light transmission length becomes larger, the focussing action becomes weaker. As the result, the radial distribution of the propagation mode fields (or the mode volume) of the optical fiber spreads and finally arrives at the discontinuous boundary of the refractive index distribution. At last, all the propagation modes come to undergo the total reflection at the boundary. Under such state, the transmission characteristic of the graded-core optical fiber becomes similar to that of the cladding type of the two-layer structure, and the effect of widening the band owing to the continuous variation of the refractive index distribution cannot be achieved.

Further, the third method forms a three-layer structure (W-type optical fiber) which consists of a core having the highest refractive index, an intermediate layer having the lowest refractive index, and a cladding having a medium refractive index (U.S. Pat. No. 3,785,718). According to this method, the components of higher order modes are made leaky and the components of propagation modes are limited to only lower order modes. Thus, the group delay difference is made small, and the transmission bandwidth is expanded.

In order to expand the transmission bandwidth by the optical fiber, however, the difference between the refractive indexes of the core and the cladding layer need be made very small. By way of example, in order to make the BL product greater than 200 MHz.km, the refractive index difference need be made below 0.05%. To this end, the required accuracy of refractive indexes in the process of manufacturing the optical fiber is at least 0.01% or so. This is extremely difficult technically.

As the forth method, there has been proposed an optical fiber composed of a central layer whose refractive index decreases gradually from the center in the radial direction, and a layer which is provided around the central layer and which has a refractive index being lower than the highest refractive index of the central layer and being higher than the lowest refractive index thereof.

According to the optical fiber, mode components whose mode index (the ratio of the phase constant to the wave number) lies between the refractive index of the central layer and that of the cladding layer are propagative and do not suffer from any loss. In contrast, mode components whose mode index lies between the refractive index of the cladding layer and the lowest refractive index are coupled with the cladding layer and consequently become leaky, and suffer from reactive losses. Since such leaky modes have greater group delays than the propagation modes, their existence gives rise to lowering in the transmission bandwidth, and they are unnecessary for rendering the band wide. A sufficient attenuation need therefore be bestowed on the leaky modes. However, once the refractive index distribution of the central layer has been determined, the radial width of a part whose refractive index is lower than that of the cladding layer is uniquely decided. It is accordingly impossible to freely control the attenuation of the higher order modes being the leaky modes, and the structure and the design lack in versatility. Further, after a long distance transmission, a portion in which the propagation modes exist becomes, at last, that part of the central layer at which the mode index is higher than the refractive index of the cladding. Therefore, the diameter of the substantial core (central layer) is considerably smaller than the inside diameter of the cladding layer. This is inconvenient in launching light into the optical fiber and in optically connecting the optical fibers to each other.

SUMMARY OF THE INVENTION

The principal object of this invention is to provide an optical fiber whose BL product is large and simultaneously whose substantial core diameter is large.

Another object of this invention is to provide a graded-core optical fiber which can bestow any desired attenuation on unnecessary higher order modes arising after a long distance transmission.

In order to accomplish the objects, this invention forms an optical fiber into a concentric three-layer structure consisting of a core whose refractive index varies continuously from the center towards the periphery, an intermediate layer which has a uniform refractive index being lower than in the core, and a cladding which has a uniform refractive index being substantially equal to the lowest refractive index in the core.

DESCRIPTION OF THE PREFERRED EMBODIMENT

Figure 1:
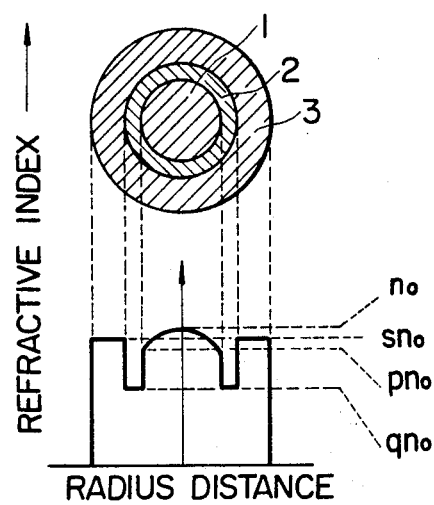
FIG. 1 is a diagram of the refractive index distribution of an optical fiber for explaining the principle of the optical fiber according to this invention.

Referring to FIG. 1, which shows the radial refractive index distribution of an optical fiber in accordance with this invention, the optical fiber is concentrically formed of three layers; a core layer, an intermediate layer and a cladding layer. The core layer 1 has a varying refractive index which decreases from the highest refractive index $n_o$ at the center towards the lowest refractive index $pn_o$ at its boundary portion. The refractive index of the intermediate layer 2 has a constant value $qn_o$ which is lower than the value $pn_o$. The refractive index $sn_o$ of the cladding layer 3 is smaller than $n_o$ and larger than $pn_o$. The radius of the core is denoted by $a$, and the width of the intermediate layer is denoted by $\delta a$. Here, the following relation holds in the optical fiber according to this invention:

$$q < p \leq s < 1 \quad (1)$$

Hereunder, the principle of this invention will be explained.

Modes which remain propagative even after a long distance transmission are only those which have mode indexes between the values $n_o$ and $sn_o$. Higher order modes whose indexes are smaller than $sn_o$ become leaky. When the higher order modes are regarded as unnecessary modes, the optical fiber need not have refractive indexes smaller than $sn_o$ in the core thereof. That is, only a part exceeding $sn_o$ in the refractive index has the substantial function as the core. It is therefore necessary and sufficient that the refractive index distribution of this part is decreased continuously in the radial direction (the most preferable distribution is a parabolic distribution). This can be expressed as follows:

$$q < p = s < 1 \quad (2)$$

It is not easy to actualize a structure as indicated by Eq. (2), but it is not greatly influential in practice to make the ratio $p$ of refractive indexes somewhat smaller than $s$.

The attenuation of unnecessary leaky mode components whose mode refractive indexes lie between $sn_o$ and $n_o$ when the optical fiber is constructed as described above increases as the width $\delta a$ of the intermediate layer becomes smaller. Further, the attenuation of the leaky modes increases as the order of the mode becomes higher. Therefore, when the attenuation of the lowest order leaky mode component is set at above a predetermined value corresponding to a transmission length, the influence of the leaky mode components on the bandwidth characteristic can be neglected.

With the optical fiber according to this invention, the attenuation of the unnecessary leaky mode components can be freely controlled merely by changing the width $\delta a$ of the intermediate layer.

Another advantage attained by the use of the fiber construction according to this invention is that the substantial core diameter can be made relatively large as compared with that in the prior art.

Important here is that the unnecessary leaky modes are sufficiently attenuated and that the stability of the fiber transmission characteristic against external stresses ascribable to bending etc. is made high. To this end, it is necessary to make the difference between the refractive indexes of the core and the intermediate layer large and to make the width of the intermediate layer small. It cannot be said desirable that, in order to make the transmission bandwidth large, the difference between the refractive indexes of the core and the cladding is rendered considerably large. Because it becomes necessary to precisely control the refractive index distribution in the core. In order to enhance the stability of the fiber, accordingly, there arises the necessity for making the difference between the refractive indexes of the intermediate layer and the cladding large.

With hitherto-known optical fibers, however, such requirement cannot be fulfilled. With the structure of the optical fiber according to this invention, the difference between the refractive indexes of the intermediate layer and the cladding can be made large for the reason described previously.

Unlike the prior-art optical fiber, the optical fiber according to this invention need not control the continuous distribution over a wide range of refractive indexes. This is advantageous in manufacture. In order to control the refractive index distribution, there is commonly employed a method in which a glass material of, for example, $SiO_2$ to serve as a host is doped with an oxide such as $GeO_2$, $TiO_2$, $P_2O_5$, $B_2O_3$ and $Al_2O_3$ and in which the quantity of doping is varied in the radial direction. In case of making the refractive index gradient large, the concentration gradient of the dopant need be made large. However, when the concentration gradient of the dopant is large, it is often the case that the diffusion of the dopant arises in thermal processes attendant upon the fabrication of a preform, the drawing of the fiber, etc. and that the control of the refractive index distribution becomes complicated. On the other hand, where the refractive index variation in the core may be small as in this invention, the concentration gradient of the dopant may be small as well. Therefore, the inconvenience attendant upon the diffusion as stated above is difficult to occur. This constitutes the merit of this invention in manufacture.

Hereunder, this invention will be described in connection with an example.

EXAMPLE

A mixture gas consisting of silicon tetrachloride $SiCl_4$, oxygen $O_2$ and boron bromide $BBr_3$ was caused to flow through the interior of a natural quartz tube which had an inside diameter of 12 mm$\phi$ and an outside diameter of 14 mm$\phi$ and which was rotating at 50 r.p.m.

Simultaneously therewith, the quartz tube was heated in such a way that a local heating device was reciprocated relative to the quartz tube at a speed of 2.5 mm/sec. Thus, a uniform silicon dioxide (SiO$_2$) film containing boron oxide B$_2$O$_3$ was deposited on a tube wall. Subsequently, the boron bromide gas was changed over to phosphorus oxychloride POCl$_3$, the concentration of which was increased in proportion to substantially the square root of the reaction time. Thus, a silicon dioxide (SiO$_2$) film which had a concentration gradient of phosphorus pentoxide P$_2$O$_5$ in the direction of the thickness of the film was deposited. Thereafter, the resultant quartz tube was densely fused to its axis and was heated and drawn into an optical fiber.

Figure 2:
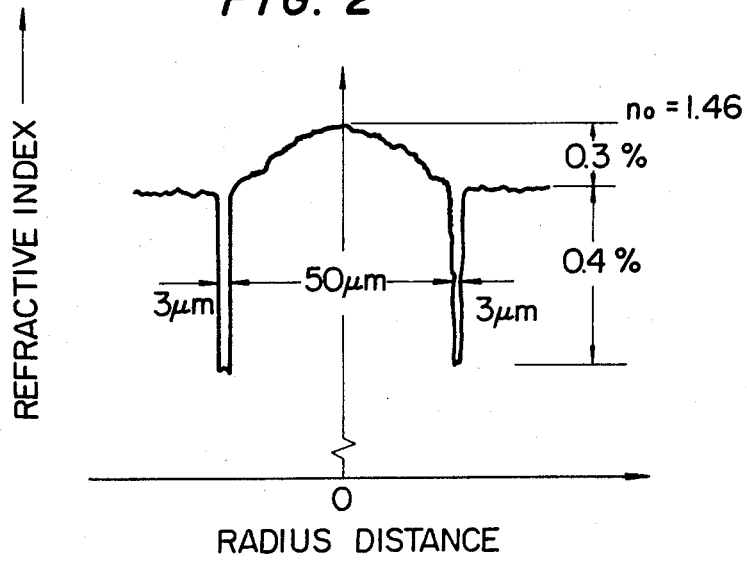
FIG. 2 is a diagram of the refractive index distribution of an embodiment of the optical fiber according to this invention.

A refractive index distribution in a section of the fiber thus obtained was measured. The result of measurement is shown in FIG. 2. Letting $$n(r) = n_o(1 - Ar^\alpha)$$

denote the refractive index distribution in the core, the quantities were $\alpha \approx 2.1$, $A \approx 3.5 \times 10^{-6}$ and $n_o \approx 1.46$. Here, r denotes the distance (in micron) from the center of the fiber. The diameter of the core of the fiber was 50 microns, the width of the intermediate layer was 3 microns, and the diameter of the whole fiber was 130 microns. The reason why the width of the intermediate layer was made 3 microns was to bestow sufficient attenuation on the leaky modes.

The transmission bandwidth of the above fiber for a gallium arsenide semiconductor laser having a wavelength of 0.835 micron was actually measured as to eight specimens of the same specifications. Then, it was 290 to 720 MHz.km, and was 470 MHz.km on the average. The transmission length was 0.33 to 1.22 km, and was 0.71 km on the average.

As set forth above, according to this invention, the diameter of the core of the fiber can be made relatively large, and the graded-core wide-band fiber in which the attenuation of unnecessary leaky modes can be freely controlled and besides the control of a refractive index distribution is comparatively easy can be realized.

We claim:

1. An optical transmission line composed of an optical fiber, comprising:
   (a) a core layer whose refractive index decreases continuously in the radial direction from its center,
   (b) a cladding layer which has a uniform refractive index being substantially equal to a lowest refractive index of said core layer, and
   (c) an intermediate layer which intervenes between said core layer and said cladding layer and which has a uniform refractive index being lower than said lowest refractive index of said core layer,
   (d) the three layers being concentrically arranged.

2. An optical transmission line according to claim 1, wherein the difference between the refractive index of said cladding layer and the refractive index of said intermediate layer is large.

3. An optical transmission line according to claim 2, wherein said difference is approximately 0.4%.

4. An optical transmission line according to claim 2, wherein the width of said intermediate layer is controlled to be small compared to the radius of said core layer.

5. An optical transmission line according to claim 4, wherein said width of said intermediate layer is controlled to be approximately 07.5% of said radius of said core layer.

6. An optical transmission line according to claim 1, wherein the width of said intermediate layer is controlled to be small compared to the radius of said core layer.

7. An optical transmission line according to claim 6, wherein said width of said intermediate layer is controlled to be approximately 07.5% of said radius of said core layer.

* * * * *